United States Patent [19]

Kleider

[11] Patent Number: 5,398,456

[45] Date of Patent: Mar. 21, 1995

[54] GUIDE PLATE FOR HAND POWER TOOL

[75] Inventor: Albert Kleider, Schwäbisch Hall, Germany

[73] Assignee: Robert Bosch GmbH, Stuttgart, Germany

[21] Appl. No.: 70,346

[22] Filed: May 28, 1993

[30] Foreign Application Priority Data

Mar. 26, 1991 [DE] Germany ............ 41 09 839.0

[51] Int. Cl.⁶ .................................... B24B 19/00
[52] U.S. Cl. ............................... 451/415; 30/371; 83/821; 451/488; 451/358
[58] Field of Search ............. 51/241 R, 241 G, 268, 51/170 R, 170 PT; 30/371, 373, 375, 376, 377; 83/821, 824; 125/13.01

[56] References Cited

U.S. PATENT DOCUMENTS

| | | | |
|---|---|---|---|
| 2,623,557 | 12/1952 | Kendall | 30/373 |
| 3,298,407 | 1/1967 | Scott . | |
| 3,586,077 | 6/1971 | Pease | 30/376 |
| 3,973,459 | 8/1976 | Stowe | 83/824 |
| 4,397,089 | 8/1983 | Pease | 30/373 |
| 4,552,192 | 11/1985 | Eaves | 30/371 |
| 4,905,745 | 3/1990 | Jaeger | 83/821 |
| 5,136,910 | 8/1992 | Kohn et al. | 30/377 |

FOREIGN PATENT DOCUMENTS 347107 12/1978 Germany .
3007310 9/1981 Germany .
8516029 7/1985 Germany .

Primary Examiner—Maurina T. Rachuba
Attorney, Agent, or Firm—Michael J. Striker

[57] ABSTRACT

A guide plate for guiding a power hand tool along a guide rail placed on a workpiece, has a guide channel formed to embrace the guide rail and provided with guide surfaces for sliding along lateral surfaces of the guide rail. The guide channel is formed by at least two elongated bridge-type beads arranged at a distance from one another and by recesses located in a plane and aligned with the beads so as to extend on both sides of the beads following immediately from the beads. The guide channel has a greater clearance dimension in relation to a width of the guide rail. The guide surfaces are formed in pairs on two necks which are provided in the guide channel at a separation from each other with a clearance width which is slightly greater than the width of the guide rail.

7 Claims, 4 Drawing Sheets

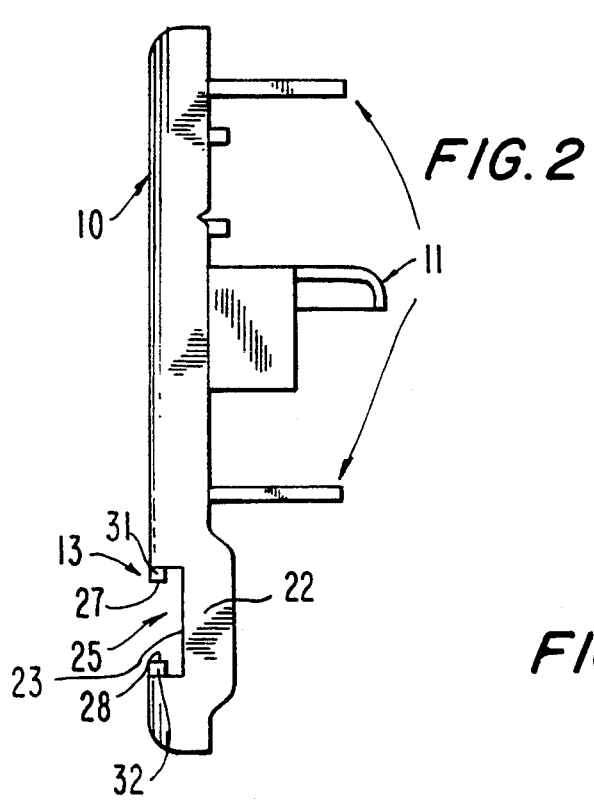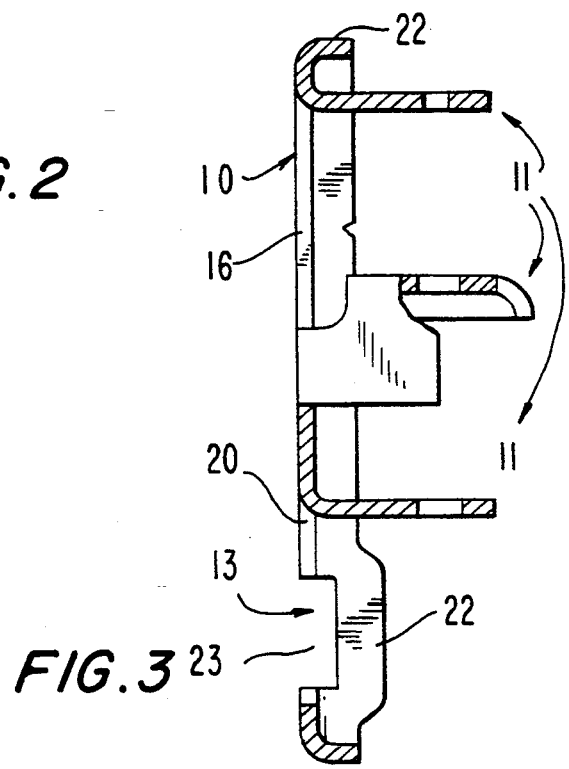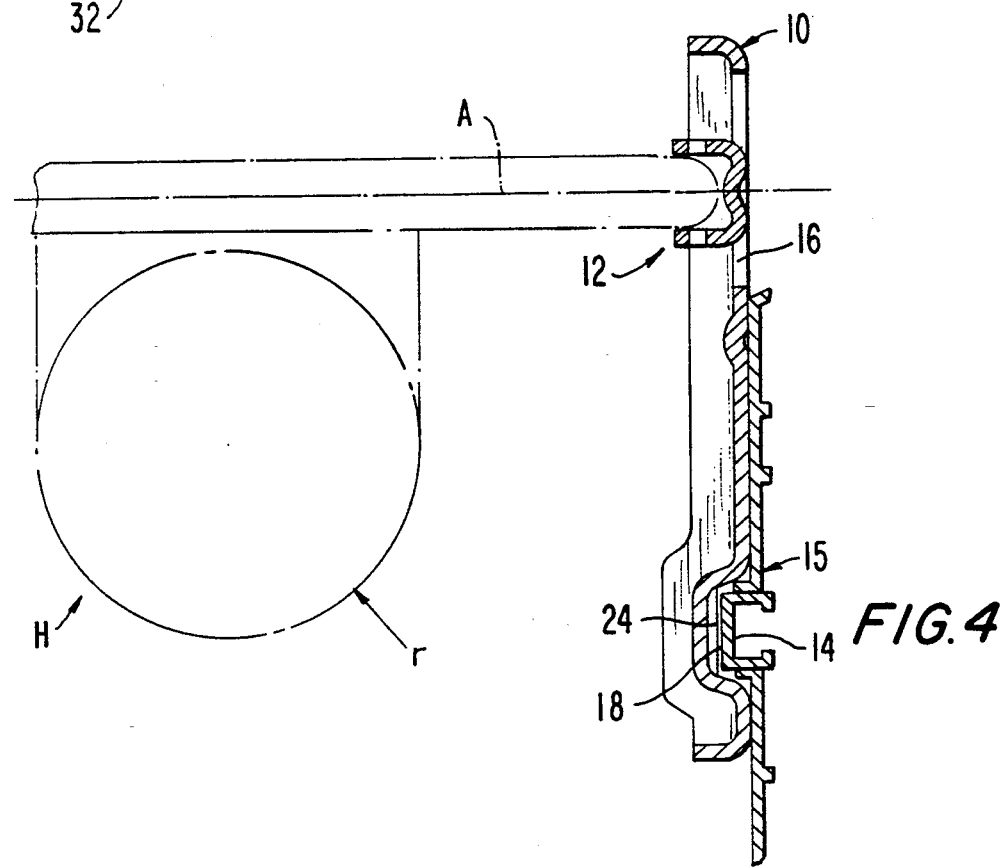

GUIDE PLATE FOR HAND POWER TOOL

BACKGROUND OF THE INVENTION

The present invention relates to a guide plate for a power hand tool, in particular an angle grinding machine.

More particularly, it relates to such a guide plate which guides the power hand tool along a guide rail placed on a workpiece, with a guide channel to embrace the guide rail and with guide surfaces designed in the guide channel for sliding along the lateral surfaces of the guide rail.

In a known guide plate of this type for a portable circular saw (DE 30 07 310 C2), the guide channel is formed by tabs, which are partly punched out of the guide plate and bent up from the plane of the plate. The tabs extend parallel at a clear separation from one another which is slightly larger than the width of the guide rail, and with their side faces which protrude at approximately right angles to the guide plate and which face each other, they form the guide surfaces whose surface normals extend parallel with the rotational axis of the saw blade. The tabs extend virtually over the entire length of the guide plate, leaving lands only at the ends of the guide plate. For greater stiffness of the guide plate, several bridges distributed over the length of the guide channel can be provided.

In order to achieve a smooth guidance of the guide plate on the guide rail, which will not jam and is free from play, and which will ensure close cutting tolerances of the portable circular saw, the punched tabs must be bent up very precisely so as to provide the required close guidance tolerance of the guide channel. This makes the manufacturing process of the guide plate very costly.

SUMMARY OF THE INVENTION

Accordingly, it is an object of the present invention to provide a guide plate for a power hand tool, which avoids the disadvantages of the prior art.

In keeping with these objects and with others which will become apparent hereinafter, one feature of the present invention resides, briefly stated, in a guide plate in which the guide channel is formed by at least two lengthy bridge-type beads which are arranged at a distance from each other and by recesses in the plate plane which are aligned with these and which extend on both sides of the beads following on immediately from these, the guide channel has a greater clearance dimension in relation to the width of the guide rail, and the guide surfaces are designed in pairs on two necks at a separation from each other, the clearance width of which is slightly larger than the width of the guide rail.

When the guide plate for a power hand tool is designed in accordance with the present invention, it has the advantage that due to the design of the guide channel, the guide plate is guided on the guide rail at only two points which should be separated as far as possible from each other with relatively minor axial dimensions, thereby ensuring easy sliding, free from jamming, of the guide plate along the guide rail. With little secondary working, the guidance play can be kept to close tolerance on the two necks in the guide channel, which provide for high cutting accuracy when working with the power hand tool.

In a preferred embodiment of the invention, the two necks in the guide channel are formed by two lands which are opposite each other and which start in the plate plane from both sides of a recess in one piece from the guide plate and project into the appropriate recess. The guide surfaces are formed by the front faces of these lands which are opposite each other. These steps allow the guide plate to be manufactured very simply, for example as an inexpensive sheet metal construction. The punching operation at the same time produces the guide surfaces. Any subsequent machining of the guide surfaces is easily accomplished and can be carried out at little cost.

In a further embodiment of the invention, the two necks in the guide channel are formed by a plastic guide piece with an approximately 'U' shaped cross-section, which is self-retained by a recess formed in the beads. In this configuration, the guide surfaces are formed by the leg inner faces of the guide pieces which are opposite each other. This has the advantage that the guide surfaces, whose tolerance is of critical importance, are removed from the guide plate manufacturing process, and are manufactured separately. When wear of the guide pieces occurs, they can be easily removed without the need for special tools, and the machining accuracy of the power hand tool can again be restored. Due to the flush fitting of the two guide pieces into recesses specially provided in each bead, there is no loss of cutting depth.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 shows a side view of the guide plate in accordance with arrow II in FIG. 1, with the hand power tool, FIG. 3 shows a section of the guide plate through III—III in FIG. 1, FIG. 4 shows a section of the guide plate in FIG. 1 with a guide rail arranged below it, through IV—IV in FIG. 1.

DESCRIPTION OF HE PREFERRED EMBODIMENTS

Figure 1:
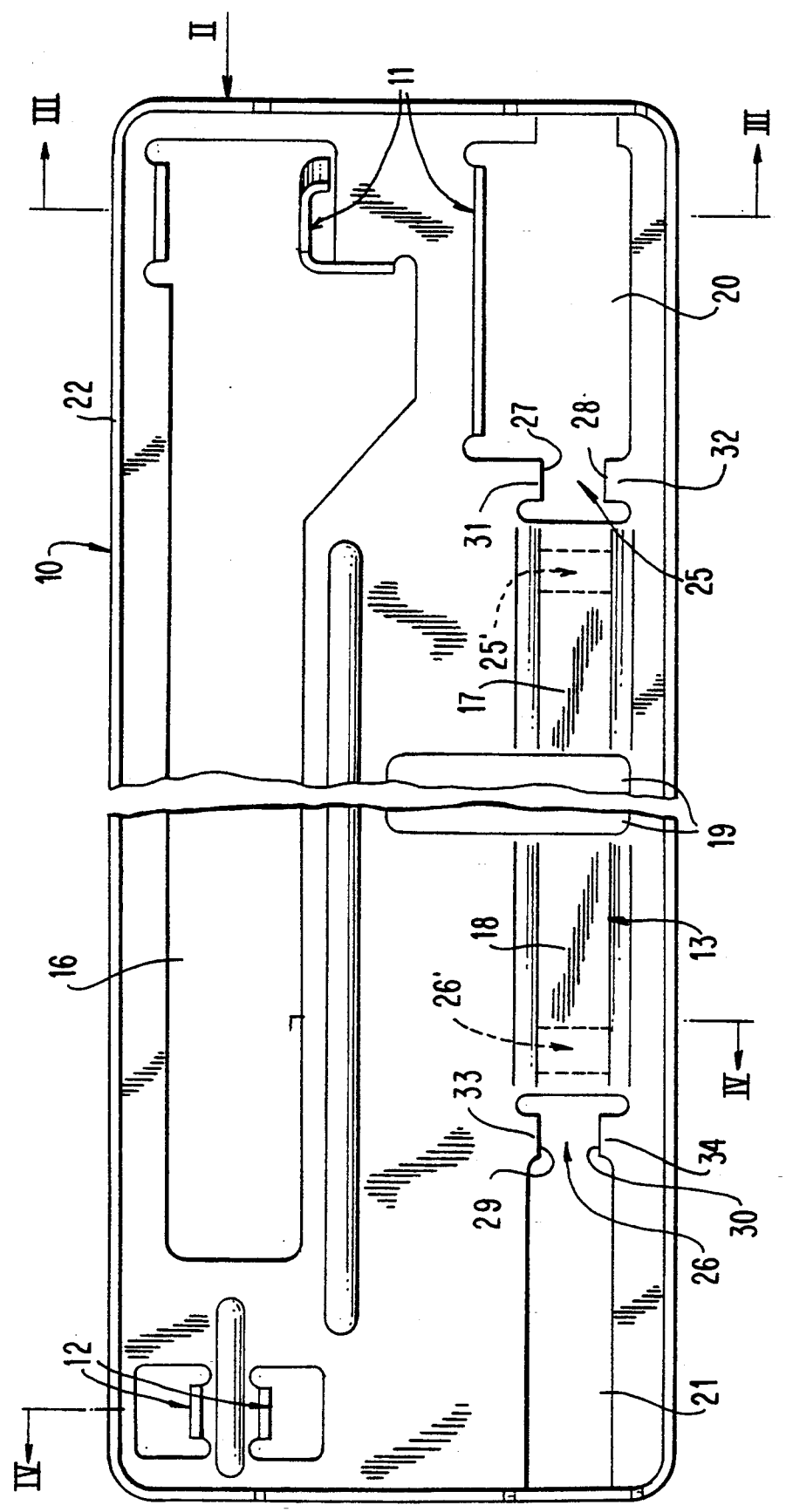
FIG. 1 shows part of the top view of a guide plate for an angle grinder.

The guide plate 10, shown in FIG. 1 in a top view and in part, for an angle grinder as an example of a power hand tool, is made from a sheet metal plate and has a support, designated 11, for the angle grinder, and a slot-like aperture 16 for penetration by the cutting wheel of the angle grinder. The support 11 is formed by the various sheet metal tabs which are partly punched out of the plate plane and bent at right angles. In this support 11 which is formed in one end region of the guide plate 10, the angle grinder is accommodated in a pendulum fashion. In addition, a fixing device 12 for a quadrant adjuster, which is not shown, is provided in the opposite end region of the guide plate 10. This fixing device 12 consists of two sheet metal tabs which are partly punched out of the guide plate 10 and bent upwards. The quadrant adjuster is attached to the housing of the angle grinder. By increasing or decreasing the arc length between the fixing device 12 and the fixing point of the quadrant adjuster on the machine housing in a known manner, the portion of the circle of the cutting disc which penetrates through the aperture 16 in the guide plate 10, and thereby the depth of cut, is set.

Figure 1A:
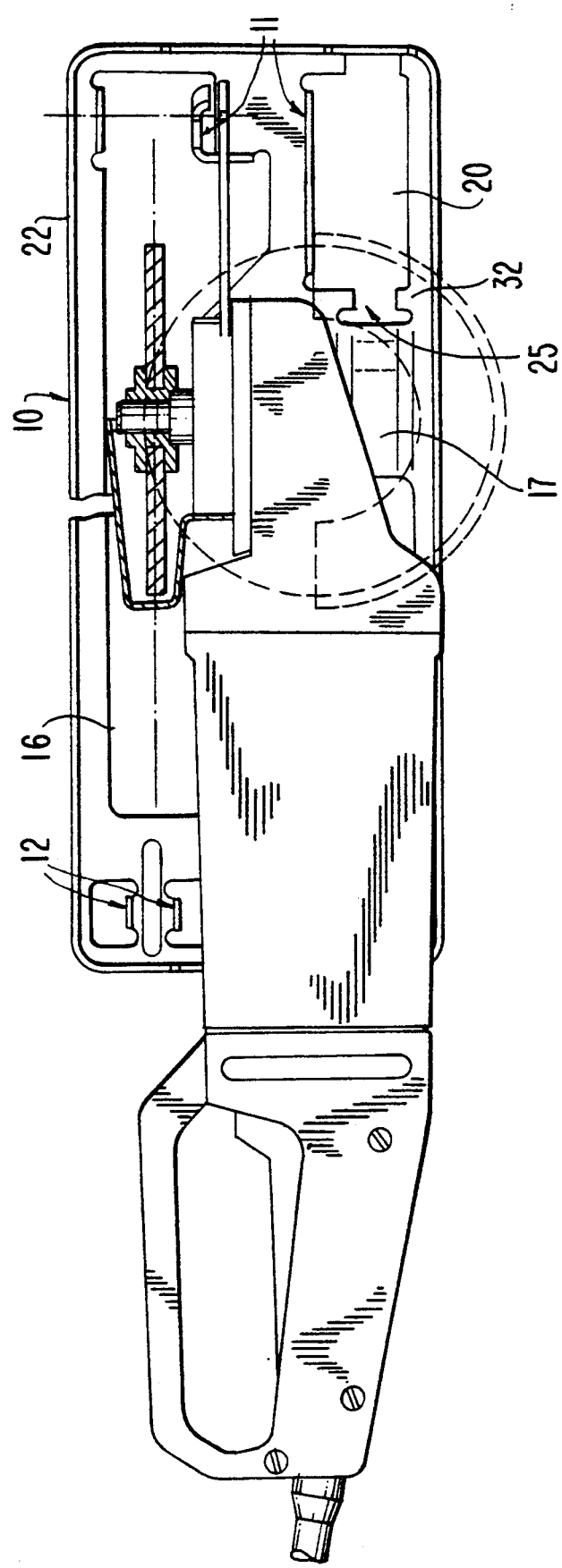
FIG. 1a is a view substantially corresponding to the view of FIG. 1, but additionally showing a hand power tool arranged on the guiding plate.

FIG. 1a shows how the hand power tool T with a grinding wheel W is arranged on the guide plate 10. The center line of the grinding wheel is identified as A and a pivot axis which connects the guide plate 10 with the hand power tool formed as angle grinder is identified as B. FIG. 4 shows the housing H of the angle grinder with the rear end r.

The guide plate 10 has a guide channel 13 which, together with a guide rail 14 (FIG. 4) forms a guiding device for the guidance of the guide plate 10 and hence, of the angle grinder, on a workpiece being machined. The guide rail 14, preferably manufactured from aluminum section, is part of a guide rule 15, which is placed with its well adhering underside on the workpiece. The guide plate 10 is placed on the guide rule 15, with the guide channel 13 covering the guide rail 14. The upper face of the guide rule 15 forms a good sliding surface for the guide plate 10.

The guide channel 13 is formed by two lengthy, bridge-like beads 17, 18, which are arranged with a separation from each other, and by recesses 19, 20, 21 in the guide plate 10. The recesses 19, 20, 21 are in alignment with the beads 17, 18 and follow on immediately from these on both of their faces, so that a central recess 19 defines the two beads 17, 18 on the faces which are turned towards each other, and two outer recesses 20, 21 extend from the other end of the beads 17, 18 up to the end of the guide plate 10. To provide dimensional stability of the guide plate 10, an all-round plate edge 22 is bent upwards from the plate plane which in the region of the two recesses 20, 21 has a recess 23 from the underside (FIG. 2 and 3) and 24 (FIG. 4). The depth of the recesses 23, 24 is dimensioned to correspond to the clearance height of the guide channel 13 and is greater than the height of the guide rail 14 which projects beyond the guide rule 15. The transverse clearance width of the guide channel 13 is also larger than the width of the guide rail 14.

Two necks 25, 26 of short axial lengths are provided in the guide channel 13 for the guidance of the guide plate 10 along the guide rail 14, which have two guide surfaces 27, 28 and 29, 30 arranged on them, in pairs, and facing each other with a clearance separation slightly larger than the width of the guide rail 14. Each neck 25, 26 is formed by two opposing lands 31, 32 and 33, 34 which start from both sides of the recess 20 or 21 from the guide plate 10 and project into the appropriate recess 20 or 21 within the plate plane. The front faces of the lands 31-34 which face each other form the guide surfaces 27-30. The recesses 19-21 and the lands 31-34 which lie in the plate plane are produced by punching them out of the guide plate 10.

Figure 5:
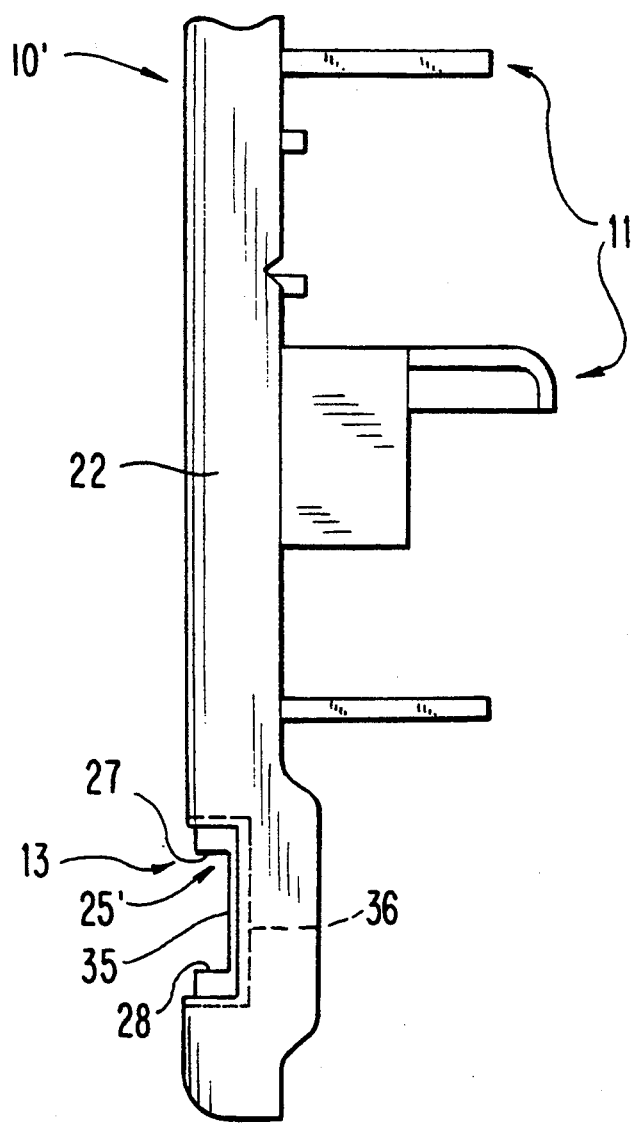
FIG. 5 shows part of a side view of a modified guide plate in accordance with a further embodiment example.

The guide plate 10' shown partly in a side view in FIG. 5 corresponds largely to the guide plate 10 in FIGS. 1-4, so that identical components are provided with identical reference symbols. A modification exists only in respect of the design of the necks 25' and 26' in the guide channel 13 and the guide surfaces provided there. The lands 31-34 in the recesses 20, 21 are dispensed with, so that these recesses 20, 21 extend over the entire length with a constant width. The necks 25', 26' are displaced into the beads 17, 18 and are formed by one plastic guide piece 35, each, as shown in FIG. 5. For reasons of simplified drawing representation, the location of the necks 25', 26' in FIG. 1 is shown by a dashed line, although the embodiment example of the guide plate 10 in accordance with FIG. 1 does not have such necks in the beads 17, 18. The guide pieces 35 which have a 'U' shaped cross-section are inserted with a self-retaining fit in the recesses 36 which are pierced from below in the beads 17, 18 at the point of the necks 25', 26'. The guide pieces 35 are preferably snapped in, with two barbs, which exist on the front faces, engaging in corresponding detents in the recesses 36. The guide faces 27, 28 (FIG. 5) are formed on the two leg inner faces of each guide piece 35 which are opposite each other.

It will be understood that each of the elements described above, or two or more together, may also find a useful application in other types of constructions differing from the types described above.

While the invention has been illustrated and described as embodied in a guide plate for a power hand tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A guide plate for guiding a power hand tool along a guide rail placed on a workpiece, the guide plate comprising a guide channel formed to embrace the guide rail and integrally provided with guide surfaces for sliding along lateral surfaces of the guide rail, said guide channel being formed by at least two elongated bridge-type beads arranged at a distance from one another and by recesses located in a plane and aligned with said beads so as to extend on both sides of said beads following immediately from said beads, said guide channel having a greater clearance dimension in relation to a width of the guide rail, said guide surfaces being formed in pairs integrally on two necks which are provided in said guide channel at a separation from each other with a clearance width which is slightly greater than the width of the guide rail.

2. A guide plate as defined in claim 1, wherein said two necks in said guide channel are formed by two lands which are opposite to each other in the plate plane and which, starting from both sides of one of said recesses project into said recess, said lands having front faces which lie opposite each other and form said guide faces.

3. A guide plate as defined in claim 1, wherein said guide plate is composed of sheet steel.

4. A guide plate as defined in claim 3, wherein said recesses and said lands are punched-out formations of the guide plate.

5. A guide plate as defined in claim 1, wherein said necks in said guide channel are formed by a plastic guide piece having a substantially U-shaped cross-section and inserted so as to be self-retaining in a recess provided said beads, said guide piece having legs with leg inner faces located opposite each other and forming said guide faces.

6. A guide plate as defined-in claim 5, wherein said guide piece is clipped in said recess formed in said beads.

7. A guide plate as defined in claim 1; and further comprising a support which protrudes at a right angle from said plate plane for supporting the power hand tool, and a slot-type opening which extends parallel to said guide channel for penetrating of a rotating cutting tool.

* * * * *